United States Patent [19]

Teece

[11] Patent Number: 5,537,605

[45] Date of Patent: Jul. 16, 1996

[54] METHOD AND APPARATUS FOR CONTROLLING AT LEAST ONE PIECE OF EQUIPMENT

[75] Inventor: Howard J. Teece, Basingstoke, United Kingdom

[73] Assignees: Sony Corporation, Tokyo, Japan; Sony United Kingdom Limited, Middlesex, England

[21] Appl. No.: 376,680

[22] Filed: Jan. 23, 1995

Related U.S. Application Data

[63] Continuation of Ser. No. 46,133, Apr. 15, 1993, abandoned.

[30] Foreign Application Priority Data

Jul. 14, 1992 [GB] United Kingdom ............... 9214919

[51] Int. Cl.⁶ .................................................. G06F 15/46
[52] U.S. Cl. ...................... 395/800; 395/162; 364/146; 364/188
[58] Field of Search ................................. 395/800, 162; 364/DIG. 1, 146, 188

[56] References Cited

U.S. PATENT DOCUMENTS

| | | | |
|---|---|---|---|
| 4,488,148 | 12/1984 | Xuciere | 345/172 |
| 4,742,443 | 5/1988 | Rohn et al. | 364/136 |
| 4,747,100 | 5/1988 | Roach et al. | 370/85.5 |
| 4,916,640 | 4/1990 | Gasperi et al. | 382/45 |
| 4,928,249 | 5/1990 | Vermesse | 395/110 |
| 4,942,552 | 7/1990 | Merrill et al. | 395/275 |
| 4,979,094 | 12/1990 | Gemmell et al. | 364/188 |
| 5,072,374 | 12/1991 | Sexton et al. | 395/800 |
| 5,162,986 | 11/1992 | Graker et al. | 364/146 |
| 5,251,125 | 10/1993 | Karnowski et al. | 364/189 |

FOREIGN PATENT DOCUMENTS

| | | |
|---|---|---|
| 0129286 | 12/1984 | European Pat. Off. . |
| 0203668 | 12/1986 | European Pat. Off. . |
| 0288169 | 10/1988 | European Pat. Off. . |
| 3504578 | 8/1986 | Germany . |
| 2054203 | 2/1981 | United Kingdom . |
| 2188458 | 9/1987 | United Kingdom . |
| W089/05086 | 6/1989 | WIPO . |

Primary Examiner—Eric Coleman
Assistant Examiner—Dzung C. Nguyen
Attorney, Agent, or Firm—William S. Frommer; Alvin Sinderbrand

[57] ABSTRACT

An arrangement is provided which enables one or more controllable pieces of equipment to be controlled by a control unit. Each piece of controllable equipment includes a control structure definition for that equipment. The controllable equipment is responsive to a request from the control unit to supply the control structure definitions to the control unit where it is used for programming that control unit. The control unit has a number of user operable input devices, at least some of which are programmable, and a programmable display. The control unit responds to an initial operation (e.g. an initial operation of one of the input devices) to transmit a message to the controllable equipment requesting the control structure definitions for programming the display and/or the input devices. The control unit responds to a message from the controllable unit to carry out the programming. The control structure definitions can be supplied in the form of menus and/or representations of control parameters for display on the control unit.

29 Claims, 9 Drawing Sheets

METHOD AND APPARATUS FOR CONTROLLING AT LEAST ONE PIECE OF EQUIPMENT

This application is a continuation of application Ser. No. 08/046,133, filed Apr. 15, 1993, now abandoned.

BACKGROUND OF THE INVENTION

1. Field of the Invention

The invention relates to apparatus and methods for controlling equipment and to a message packet for use with such apparatus and methods.

2. Description of the Prior Art

As equipment becomes more and more complex, it becomes progressively more difficult to provide a user interface for controlling the equipment. One example of the difficulties which can be encountered is where it is desired to control a number of different pieces of equipment by a common control unit. Ensuring compatibility of a control unit and the controlled equipment is difficult because the different pieces of equipment to be controlled may carry out different functions and/or have different control requirements. Also, even if the equipment to be controlled is essentially the same, differences in the model or version of that equipment may give rise to incompatibility.

Another area where the complexity of control is experienced is during the development of new equipment. Complex equipment typically requires a complex control hierarchy. At the lowest level of the hierarchy are hardware devices carrying out basic functions. Overlying this level there is typically provided a level of control in the form of a hardware interface for controlling the hardware. Above this level a user interface enables the user to interface with the hardware interface and ultimately with the hardware devices. Typically, the hardware interface and the user interface levels are at least partially implemented in software. Often the software for the user interface and for the hardware interface can take as long, if not longer, than the hardware to develop. Moreover, development of the user interface and the hardware interface can often be performed by different development team and/or the development of these stages is staggered. As a result of this, any small change to the hardware level or the hardware interface level can mean that a resulting change has to be made to the user interface level. To avoid errors occurring, it is important that the user interface is compatible with and has the same development level as the hardware interface and the hardware. It will be appreciated that this can cause difficulties, particularly in an example as described above where it is desired to use a common control unit for controlling different pieces of controllable equipment.

Apparatus has been proposed in which, in order to ensure compatibility between a control unit and a controllable piece of equipment, the hardware interface of the controllable equipment is effectively duplicated in the separate control unit. This means that the control unit is dedicated to the controllable equipment with the result that this arrangement is inflexible and requires significant development in order to ensure full compatibility.

SUMMARY OF THE INVENTION

An object of the present invention, therefore is to enable the control of equipment by means of a control unit in a more efficient and flexible manner.

In accordance with a first aspect of the invention, there is provided apparatus comprising a programmable control unit, controllable equipment and means for connecting the control unit to the controllable equipment wherein the controllable equipment comprises means defining a control structure for controlling the equipment and means responsive to a request from the control unit for control structure definitions to transmit the control structure definitions to the control unit, and the control unit comprises user operable input means, including input means having programmable functions, programmable display means and control means connected to the input means and the display means, which control means responds to an initial operation to transmit a message to the controllable equipment requesting control structure definitions for programming the display means and/or the input means and responds to a message from the controllable equipment including control structure definitions to allocate functions to the display and the input means in accordance with the control structure definitions.

By providing the controllable equipment with control structure definitions for that equipment, which control structure definitions can be transmitted on request to the control unit, it is possible for a general purpose control unit to be programmed in use to act as if it were a dedicated control unit for the controllable equipment currently connected to it.

The invention enables a single control unit to be used with many different pieces of equipment, whether different versions of one device or different sorts of devices. This can be achieved without the control unit having to be pre-programmed with the details of that equipment.

The invention also allows a single piece of controllable equipment to be connected to a plurality of different controllers. Thus, for example in the case of a video equipment for use in a studio or at an outside broadcast location, a large and complicated control unit may be used in a studio, whereas a lighter and simpler control unit may be desired for used for outside broadcast work.

Preferably, the initial operation is the operation by a user of a predetermined, that is a preprogrammed or dedicated, input means.

Preferably, the control structure definition defines a menu for display on the display means, the menu including at least one selectable item, and defines the allocation of a function to at least one programmable user input means for selecting a said item from the menu. A menu is preferably displayed on the display means in response to the initial operation. The display of an initial menu is used to enable the control unit programming to be adapted to the specific tasks which the user wishes to perform. In this way only a part of the control structure definitions needs to be transferred to the control unit. At least one selectable item may be a request for further control structure definitions From the controllable equipment.

Preferably, the control structure definitions can also define, for display on the display means, a representation of the status of an operating parameter of the controllable equipment. The representation may take the form of a bar chart or other suitable representation which enables the user to evaluate visually the current operation parameters or conditions of the equipment.

The control structure definitions preferably define the allocation to at least one input means of a function for controlling the operating parameter of the controllable equipment. The control unit is then, preferably, responsive to user operation of an input means which has been allocated a function to transmit a message to the controllable equipment, which message is representative of the operation of that input means, and the controllable equipment preferably responds to the message representative of the operation of that input means. In this manner, the control unit can be programmed to perform dedicated control of the operating parameters of the controllable equipment, although, when the control unit was initially connected to that equipment, it did not have any knowledge of the operation of the equipment.

The programmable display memos preferably includes a two-dimensional pixel-based display, the control means programming the display in response to the control structure definitions by activating selected pixel positions on the display. The use of a pixel-based display enables flexible display of menus and representations of operating parameters. The programmable display means preferably also includes display devices associated with respective user operable input means and programmable by the control means to indicate functions assigned to the input means by the control structure definitions. The use of display devices in this form enables the functions allocated to the input means to be indicated and can be used to display choices (i.e. a simple form of menu). In the case of a simple control unit, only one or the other form of display means may be provided. Alternatively, however, other programmable display means could be used.

The control unit and the controllable equipment are preferably provided with means for transmitting and receiving messages in the form of message packets, each message packet comprising at least a command field defining an instruction and optionally an address field identifying the intended recipient or the originator of the message and/or a data field. By use of message packets in accordance with a particular message packet structure (i.e. a predefined connection protocol) the reliable interconnection of a range of different control units and control equipment can be achieved. Preferably, each message package includes a field identifying the size of the message package. In this way variable length messages can be sent. This provides for efficient packet transmission as the length of the data transmitted in the data field can vary substantially, from simple numbers to complex menu descriptors and the like.

Preferably, the controllable equipment comprises a plurality of controllable units, each of which is provided with means defining a control structure for controlling that controllable unit and each of which is allocated a respective address and wherein the address field comprises one bit position for each controllable unit, whereby the control unit can address a plurality of controllable units simultaneously. Thus it is possible for a single control unit to control a plurality of different controllable units simultaneously.

Preferably, the connecting means is a serial data transmission medium. This enables controllable units which internally require different data widths to be incorporated into the connection protocol. It also reduces the bulk of cabling needed where the connecting means is, for example, in the form of electrical or optical cables.

Each input means preferably incorporates a user operable activating device of one of the following types: input means providing an incremental change in a value in response to user operation of an activating device; input means providing a fixed value representative of a position of an activating device; input means providing an absolute value in response to a position of an activating device with respect to a settable reference position thereof.

The invention finds particular application, but is by no means limited to the control of controllable equipment in the form of video equipment such as a video camera and/or a video effects unit and/or a video tape recorder or the like.

In accordance with a second aspect of the present invention there is also provided a method of controlling controllable equipment by means of a programmable control unit comprising controllable equipment by means of a programmable control unit comprising a plurality of user operable input means including user operable input means having programmable functions, programmable display means and control means connected to the user operable input means and the programmable display, wherein the method comprises:

providing the controllable equipment with a definition of a control structure for that equipment;

the control means responding to an initial operation to transmit a message to the controllable equipment requesting control structure definitions for programming the display and/or the programmable user input means;

the controllable equipment responding to the receipt of a message from the control unit requesting control structure definitions for programming the display and/or the programmable user input means to transmit the requested control structure definitions; and the control unit responding to control structure definitions from the controllable equipment to allocate functions to the display and/or the user operable control means in accordance with the control structure definitions.

The invention also provides a message packet for use in apparatus or a method as defined above, the message packet including at least a first field defining the size of the message packet, a second field defining an instruction, and optionally a third field identifying the intended recipient of the message packet and/or a fourth field for data.

Where there are a plurality of potential recipients for a message packet, each of which is allocated a respective address, the third field preferably comprises one bit position for each controllable unit, whereby a plurality of potential recipients for a message can be addressed simultaneously.

The invention further provides controllable equipment for use in apparatus as defined above, the controllable equipment comprising means defining a control structure for controlling the equipment, and means responsive to a request from a control unit for control structure definitions to transmit the control structure definitions to the control unit.

The invention also provides a programmable control unit for use in apparatus as defined above, the control unit comprising user operable input means, including input means having programmable functions, programmable display means, and control means connected to the input means and the display means, which control means responds to an initial operation to transmit a message to controllable equipment requesting control structure definitions for programming the display means and/or the input means and responds to a message from the controllable equipment including control structure definitions to allocate functions to the display and the input means in accordance with the control structure definitions.

DESCRIPTION OF THE PREFERRED EMBODIMENTS

Figure 1:
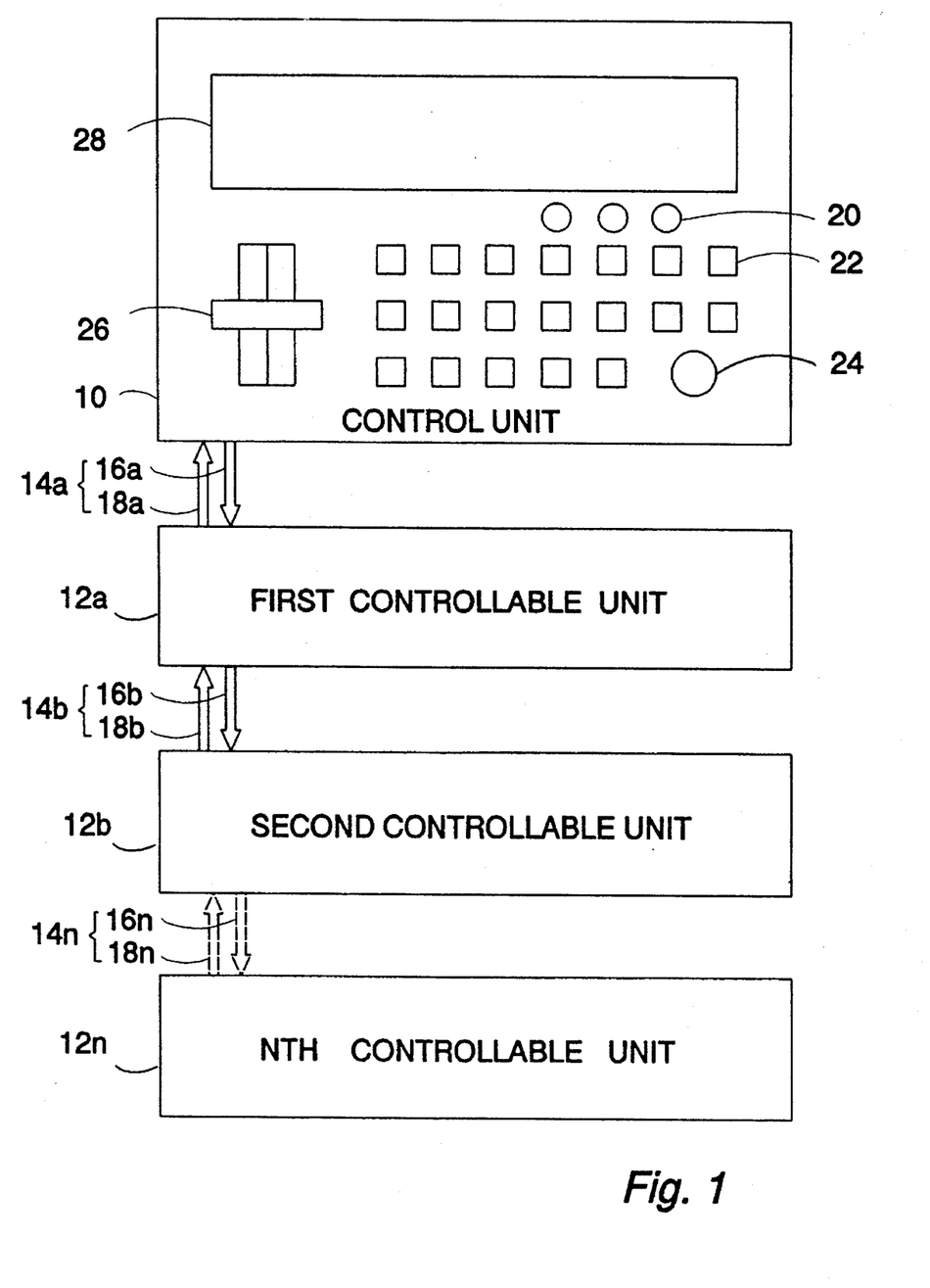
FIG. 1 is a schematic block diagram of an example of apparatus in accordance with the invention.

FIG. 1 is a schematic block diagram of an embodiment of apparatus in accordance with the invention. The apparatus includes a control unit 10 for controlling controllable equipment 12 which comprises a number of controllable units 12a, 12b . . . 12n. The control unit 10 is connected to the controllable units 12a, 12b . . . 12n by a serial data line 14 comprising an outbound link 16 and an inbound line 18. The controllable units 12a, 12b . . . 12n are linked in a so-called daisy chain manner by the serial data line 14.

The control unit 10 includes a plurality of user input devices 20, 22, 24 and 26 and a display screen 28. The display screen 28 is preferably a pixel based display screen which can be programmed to display text and/or graphic characters. In particular, the display screen is preferably programmable to display menus including a plurality of selectable items for enabling user selection of functions and/or supplementary and/or sub-menus. In addition, the display screen is preferably programmable to display representations of variables, especially control parameters, of a controllable unit by means of bar-charts or other such display representations. The bar charts can preferably be defined so as to display a current value with respect to selectable maximum and minimum values. The values to be displayed may be signed (i.e. +/−) or unsigned as required.

Different sorts of user input devices can be provided. In the present example three rotary controls 20, a plurality of keys 22, a joy stick controller 24 and a fader or a slider type control 26 are provided. At least selected ones of the user input devices 20, 22, 24 and 26 are provided with display devices (e.g. LEDs, lamps, etc.) for indicating the functions and/or states of the user input devices. These display devices are not shown in FIG. 1 for reasons of clarity.

Each controllable unit 12a, 12b . . . 12n can be any controllable unit as required by the particular application. One example only of an application for the control unit and controllable unit of the invention is a video combination for outside broadcast use. Thus, unit 12a could be a camera, unit 12b a digital multi-effects unit and 12n a video recorder. However, it will be appreciated that the invention is of general application and is not limited to use for such video devices. Also the invention is not limited to three controllable units as will be explained later.

Figure 2:
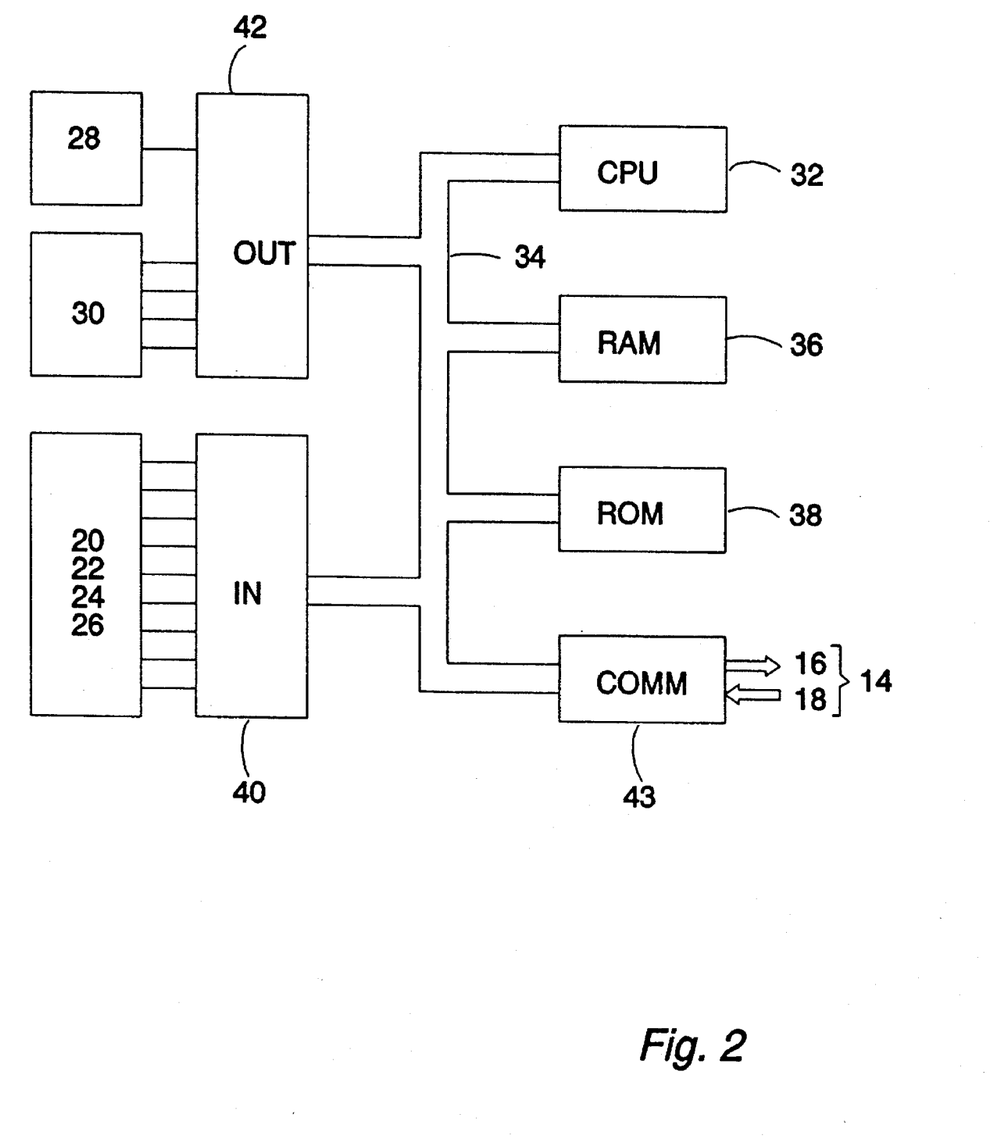
FIG. 2 is a schematic block diagram showing the system configuration of a control unit of the apparatus of FIG. 1.

FIG. 2 is a schematic block diagram illustrating the hardware structure of the control unit 10. The hardware structure of the control unit 10 is based on one or more microprocessors 32 connected via a bus 34 to other components. The other components include a working memory 36 (e.g. a random access memory) and program memory 38 (e.g. a read only memory) for the storage of control programs for controlling the operation of the control unit. An input adapter 40 is connected to the user input devices 20, 22, 24 and 26 illustrated in FIG. 1 for sensing the operation of one or more of those user input devices. An output interface 42 is connected to the display screen 28 and to other display devices 30 (not shown in FIG. 1) associated with the user input devices. The output interface 42 converts digital signals from the bus into analogue signals for controlling the display devices 28 and 30. A serial interface 43 enables the connection of the control unit to the data path 14 for connection to the controllable units 12.

Figure 3:
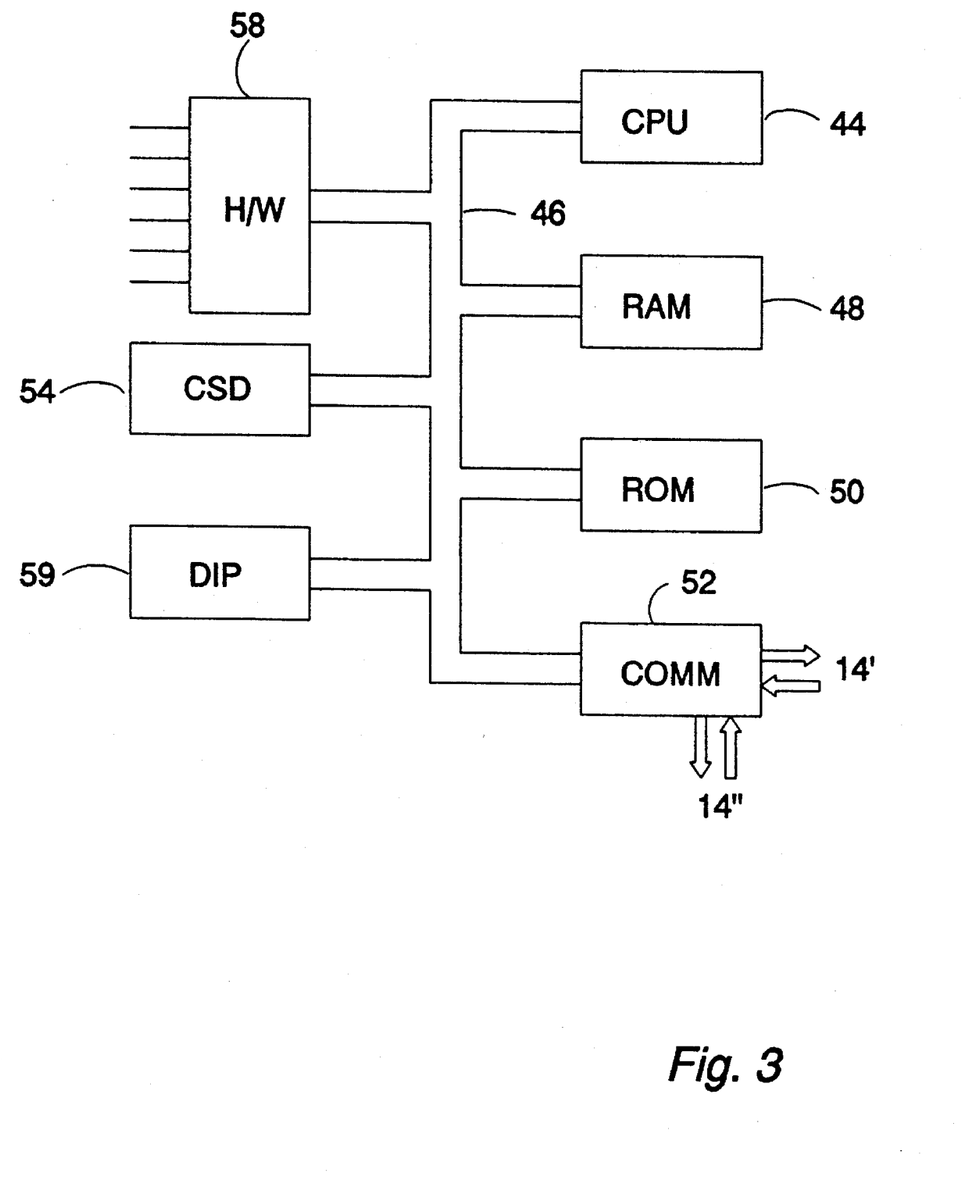
FIG. 3 is a schematic block diagram showing the system configuration of a controllable unit in accordance with the invention.

FIG. 3 is a schematic block diagram illustrating the hardware structure of part of a controllable unit. One or more microprocessors 44 is/are connected via a bus 46 to other components. The other components include a working memory 48 (e.g. a random access memory) and a program memory 50 (e.g. a read only memory) for the storage of control program for controlling the operation of the microprocessor 44. In addition a control structure definition (CSD) memory 54 (e.g. a non-volatile but programmable memory such as an EEPROM) contains control structure definition data which defines the control structure required by the controllable unit. The use of an EEPROM enables the control structure definitions to be updated in accordance with changes to the hardware and/or the hardware interface with a minimum of expense and difficulty. Other forms of data storage such as a floppy disk or hard disc could alternatively be used. The controllable unit is connected via a serial interface 52 to the data path 14' from the control unit 10, or from a controllable unit nearer the control unit 10 in the daisy chain, and also, selectively, via the continuation of the data path 14" to a subsequent controllable unit in the daisy chain. Also connected to the bus 46 is a hardware interface 58 which produces signals for controlling the hardware components (not shown) of the controllable unit. Dip switches 59 can be used for setting an address for the controllable unit. Alternatively for example, the addresses could be set using a particular instruction sequence on initialising the equipment.

Figure 4:
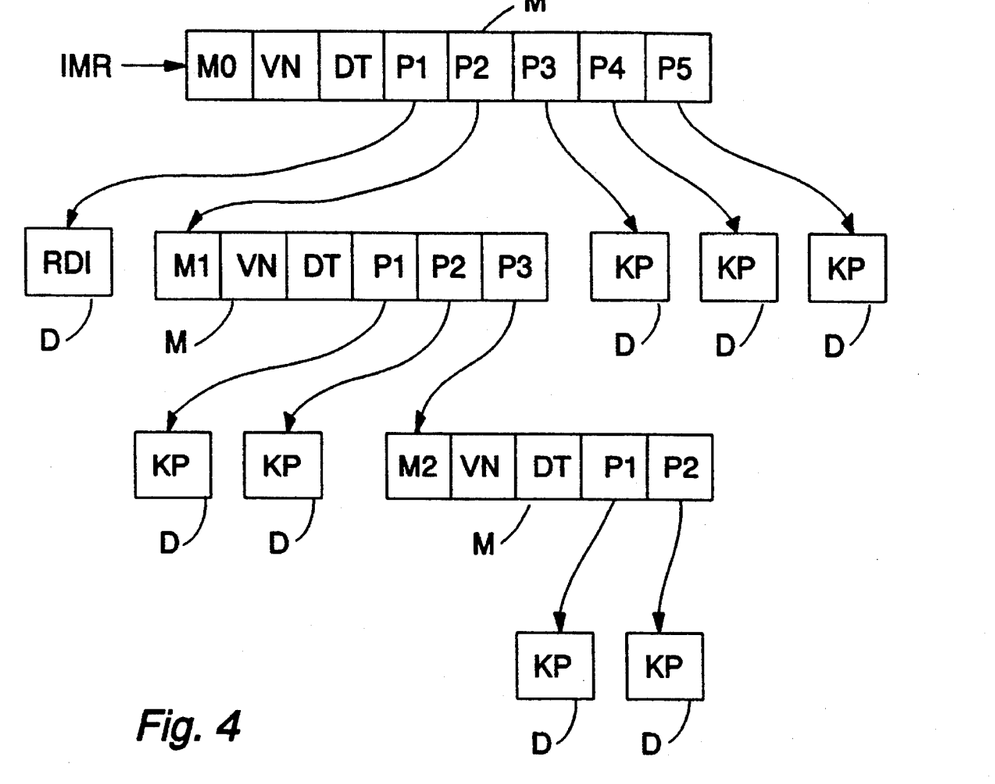
FIG. 4 is a schematic diagram of a data structure for storing control structure definitions for a controllable unit.

In one example, the control structure definitions are stored in the CSD memory 54 as a data structure formed by a combination of a tabular and a linked list structure. FIG. 4 is a schematic representation of this structure. The data structure includes menu descriptors M and item descriptors D. Each menu descriptor can include a field for the menu number M0, M1, etc., a field for the version number VN, a field for other data DT, as required, for the menu and a list of pointers P1, P2, etc. to sub-menus or device descriptors. The pointers can include sub-fields defining the type of item pointed to, the number of that item and an address for the device descriptor. Item descriptors can include, for example, a description of the control information for a rotary control device (RDI) or a description of the function given to a key for a key press operation (KP). Each item descriptor will include fields (not shown) for an ID number of the item and for defining the characteristics of that item.

The first menu descriptor (for M0) will be accessed by an initial menu request IMR. From this first menu descriptor the data associated with that menu can be accessed (item descriptors and sub-menu descriptors being accessed using the pointers) for transmission to the control unit as required.

It will be appreciated that FIG. 4 is but one example of an appropriate data structure for the control structure definitions. Alternative data structures could be used as required.

Figure 5:
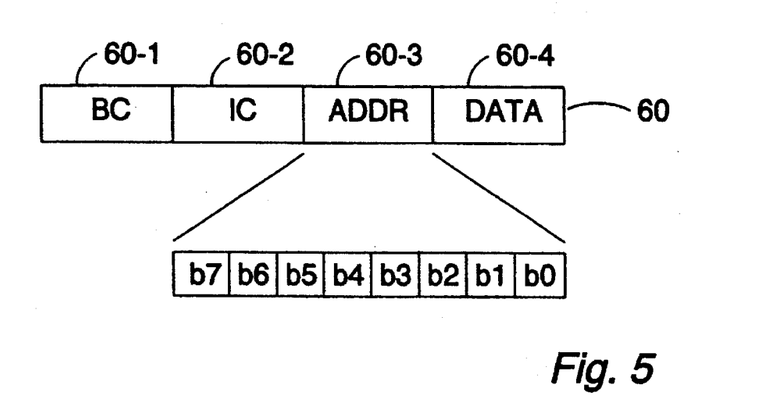
FIG. 5 is a schematic diagram illustrating a message protocol for use in the apparatus of FIG. 1.

FIG. 5 is a schematic block diagram of an example of a message packet which is sent over the data path 14. The message packet 60 which is illustrated in FIG. 5 comprises four fields 60-1 to 60-4. Field 60-1 contains a number "BC" indicating the total number of bytes in the message packet 60. Field 60-2 contains a command or instruction code "IC"

defining the purpose of the message and/or an operation to be performed by the recipient of the message packet. The third field 60-3 defines an address "ADDR" for the recipient (or originator) of the message packet. The fourth field 60-4 is a variable length field which contains data "DATA" to be transmitted between the control unit and one or more controllable units and between a controllable unit and the control unit. The data is of variable length and may indicate purely the value of variable or may define device descriptors.

FIG. 5 represents a typical message packet which is sent over the data path 14. Such a message packet structure is used, for example, for requesting initial message descriptors for a controllable unit. It is also used for requesting data values from the controllable unit for display on a display device associated with the user input device of the control unit. It can also be used by the control unit to transmit the current position or values represented by a user input device such as a slider or rotary control. In such a case, the data field 60-4 can include a menu number, a number for a particular user input device followed by the current setting of that device.

However, the transition of all four fields is not necessary for every type of instruction. For example, when a menu is being built up in the control unit, it is not necessary to send the address of the controllable unit with each component of the menu descriptor. Accordingly, an initial build menu instruction of the general format indicated in FIG. 4 can be sent from the controllable unit to the control unit. In this case, the data in the data field 60-4 can be a number identifying the particular menu to be transmitted. This menu number can, for example, be a two byte number (i.e. 16 bytes). The control logic of the control unit can be arranged to respond to the particular instruction in field 60-2 for such a menu build instruction to inhibit the further transition of messages to the controllable unit. Subsequent messages sent by the controllable unit in question, can therefore be transmitted without the transmitter address in field 60-3.

In such subsequent messages from the controllable unit, the data in the data field can identify a particular element of a menu (for example the number of a function key and the setting for that function key). A sequence of messages of this type can be sent until the menu is complete, at which point a termination message to exit the message build function can be transmitted. The final message in the sequence need not include the address field 60-3 of FIG. 5. The instruction field 60-2 can identify the message as relating to the end of a menu build phase and the data field 60-4 can identify the number of the menu which has been built by the preceding sequence. On receipt of such a message, the control unit is arranged to resume the normal operating mode where it can transmit as well as receive messages. If desired the control unit could be permitted to transmit a message terminating the build up of the menu despite being otherwise inhibited from transmitting messages.

The data field 60-4 of the instruction 60 could also be omitted in the case of certain types of instructions. For example, a general reset instruction could be provided with simply the byte count for that instruction and an instruction code indicating the reset function.

The address field 60-3 of the instruction 60 is divided into a plurality of bit fields b0-b7. Each bit field can be associated with a controllable unit in the daisy chain connected to the control unit. The binary state of each of the bit fields indicate whether or not the message packet relates to the controllable unit associated with that bit field. With the case of message packets sent from the control unit 10 to the controllable unit 12, the bits in the bit field indicate the addresses of the recipient(s). In this way, the number of controllable units may be addressed simultaneously. In the case of message packets sent from a controllable unit 12 to the control unit 10, the bit fields indicate the address of the transmitter unit. For ease of illustration in FIG. 5, the address field 60-3 includes one byte (i.e. 8 bits) whereby eight controllable units may be addressed by the control unit.

However, other numbers of bytes could be used. For example, three bytes can be used where twenty-four controllable units are to be addressed. The number of bytes used for the address can be established dynamically by transmitting an initial instruction from the control unit to the controllable units indicating the number of bytes which will be used for addressing those units. For example, an initial instruction could be sent informing the controllable units that for future instructions, three bytes will be used for the address field 60-3.

The message structures of FIG. 5 define a message protocol which enables the control unit to communicate with the controllable units. Examples of the operation of the apparatus of FIG. 1 will now be described with reference to FIGS. 6 to 11.

Figure 6:
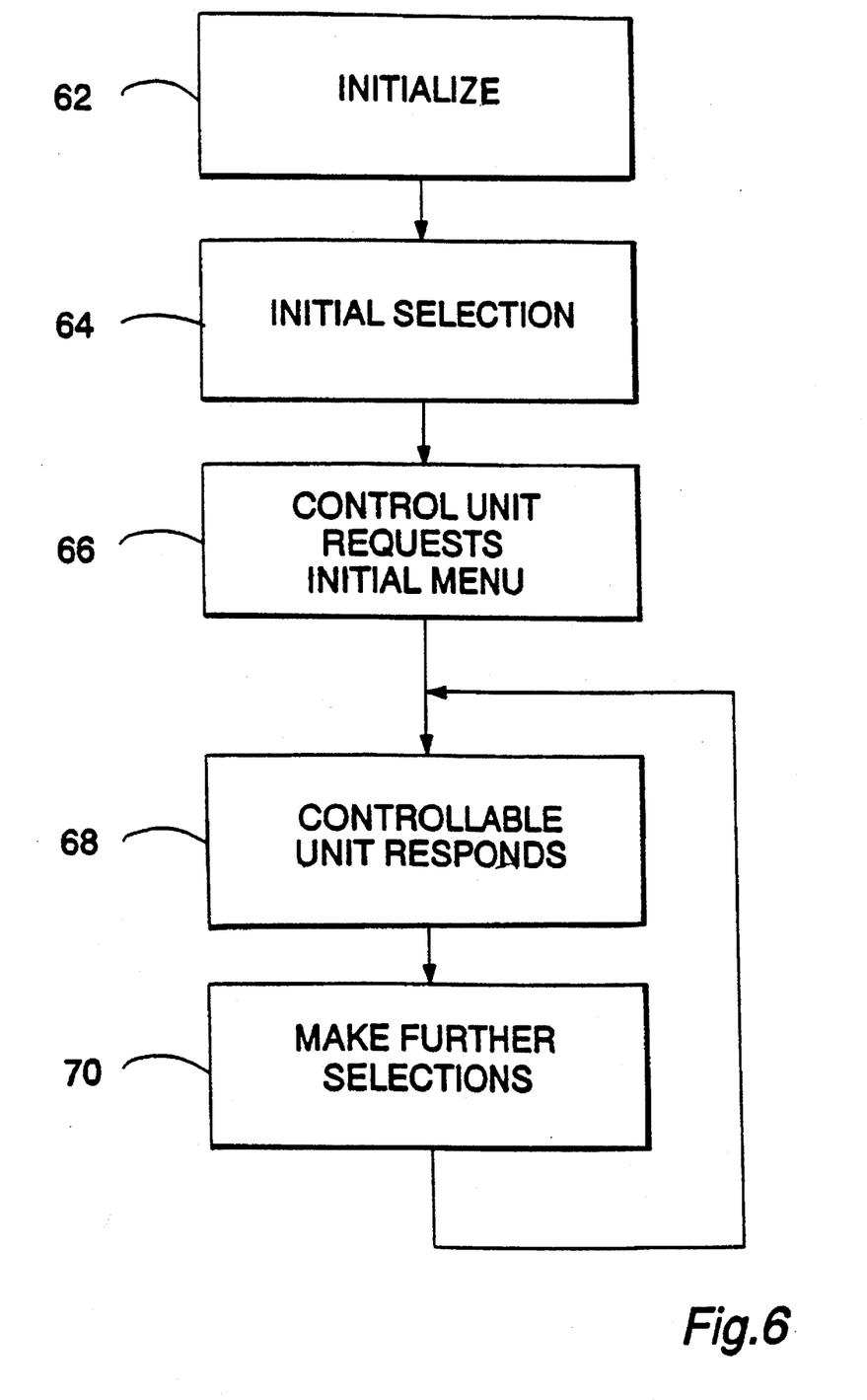
FIGS. 6–11 are flow diagrams illustrating the operation of the apparatus of FIG. 1.

FIG. 6 is a flow diagram giving an overview of the operation of the apparatus of FIG. 1. The initial step 62 is to connect up the various units of the apparatus. Thus, the control unit is connected by means of the data link (e.g. electrical or optical cables) 14a to a first controllable unit 12a. Separate outgoing and incoming lines 16a and 18a are provided in the apparatus of FIG. 1. However, by means of multiplexed control a duplex data path could be provided. The first controllable unit 12a can then be connected via a link 14b, also containing separate outgoing and incoming lines 16b and 18b, respectively. The second controllable unit 12b can then be further connected via a link 14n to further controllable unit(s) (e.g. 12n) as required. The further link also includes separate outgoing 16n and incoming 18n lines, respectively. Each of the units 12a, 12b . . . 12n is allocated an address. This can be achieved by setting the dip switches 59. However, alternative means of assigning a different address to each of the controllable units 12 (e.g. by an exchange of messages) can be employed.

On switching on the control unit 10, one of the controllable units 12a, 12b . . . 12n which it is intended to control can be selected by operating one of a number of predetermined key switches on the control unit. Each of these key switches is pre-programmed to indicate the selection of a controllable unit having a predetermined address. At the first operation of the key switch 22 in step 64 for a particular controllable unit (i.e. where that controllable unit has not previously been initialized since turning on the control unit 10) the control unit will not contain any details of the control structure of that controllable unit. Accordingly, control programs 50 in the control unit 10 will send a request in step 66 for initial control system definitions from the controllable unit in question. The request is sent in the form of a message packet 60 as illustrated in FIG. 4.

If, the control unit selected is control unit 12a, which will be assigned the first number in the series, i.e. zero, the address field 60-3 will contain the bit in bit field b0 set (e.g. to one) and the bits in all the other bit fields of the address field not set (e.g. zero). A command is inserted in field 60-2 indicating a request for initial control structure definitions. In this case, the data field 60-4 will detail which particular initial structures are required. The microprocessor 32, as controlled by programs and data in the ROM and RAM 38 and 36 will cause the message packet 60 to be output from the serial interface 43 to the controllable units 12. The data message 60 is received in the serial interface 52 of the first control unit 12a. The serial interface 52 recognises the message as being intended for the controllable unit by recognising that the zero bit field of the address field 60-3 is set. The serial interface 52 therefore causes the message packet 60 to be passed to the random access memory 48 for processing. The message packet 60 is then passed further along the daisy chain until the last controllable unit 12n. As, however, no other bit in the bit field have been set, the serial interface 52 of the other controllable units will not accept the message packet from the control unit 10.

The controllable unit 12a responds in step 68 to the initial request from the control unit 10. Control programs for responding to the messages from the control unit 10 are stored in the program memory 50 and the working memory 48. The combination of the microprocessor 44, the RAM 48, the ROM 50 and the hardware interface 58 provides a hardware interface for controlling the hardware of the controllable unit 12a. The CDS memory 54 contains data (structured, for example, as illustrated in FIG. 4) defining a control structure, in effect a user interface for the controllable unit 12a. In other words, the CDS memory 54 defines a structure for interfacing the user input devices and display devices of the control unit 10 to the hardware interface and ultimately to the hardware of the controllable unit 12a. The receipt of the initial menu request message packet from the control unit 10 causes the microprocessor 44 to access specific parts of the control unit 10 causes the microprocessor 44 to access specific parts of the control structure definition from the control structure definition memory 54. In particular, the data accessed from the control structure definitions memory 54 defines a first menu for display on the display screen 28 of the controller 10 and the allocation of certain keys on the controller 10 to enable the selection of items from the menu. The microprocessor 44 composes this data into further message packet(s) 60 for transmission to the control unit 10. The data message 60 will contain an appropriate instruction indicating the purpose of the message in the command field 60-2, bit field b0 in the address field 60-3 set to indicate the source of the message and the data field 60-4 defining data relating to the menu such as items for display and/or the allocation of functions to user input devices. This message is then transmitted via the inbound data path 18a to the control unit 10.

When the inbound message is received in the serial interface 43 of the control unit 10, it is stored in the working store 36. The microprocessor 32 interprets the data received from the controllable unit 12a to control the display of data on the display screen 28 and/or the display devices 30 associated with the input devices 22–26 and also assigns the functions to the programmable input devices 20–26 to enable selections to be made from the displayed menu. The menu may take the form of text associated with a reference number or a text associated with an identification of specific keys and/or other user input devices which need to be operated to make a selection. As described above, the menu description may be sent as a series of messages each relating respectively to descriptors for individual menu items and/or user input devices. The user is then able to make further selections in step 70 from the menu using the input devices programmed as a result of the information received from the controllable unit.

Programmable keys and/or other devices are not in themselves new and it is well known to one skilled in the art how such programmable input devices can be implemented. For example, the input device can be scanned and the result of the scanning can be used to generate codes indicative of whether particular keys are activated or not and the position of movable devices such as sliders, rotary controls, joy sticks and the like. The sensed values can be compared to reference values detected on a previous scan and stored in a random access memory to generate signals representative of changes in any value. A translation table can then be used to associate the changes as detected for specific user input devices to the functions which have been programmed for those user input devices. Accordingly as the sensing of the user input devices can be conventional, no details of this are given here.

FIGS. 7 to 11 illustrate certain examples of functions performed by the control unit and the controllable unit.

Figure 7:
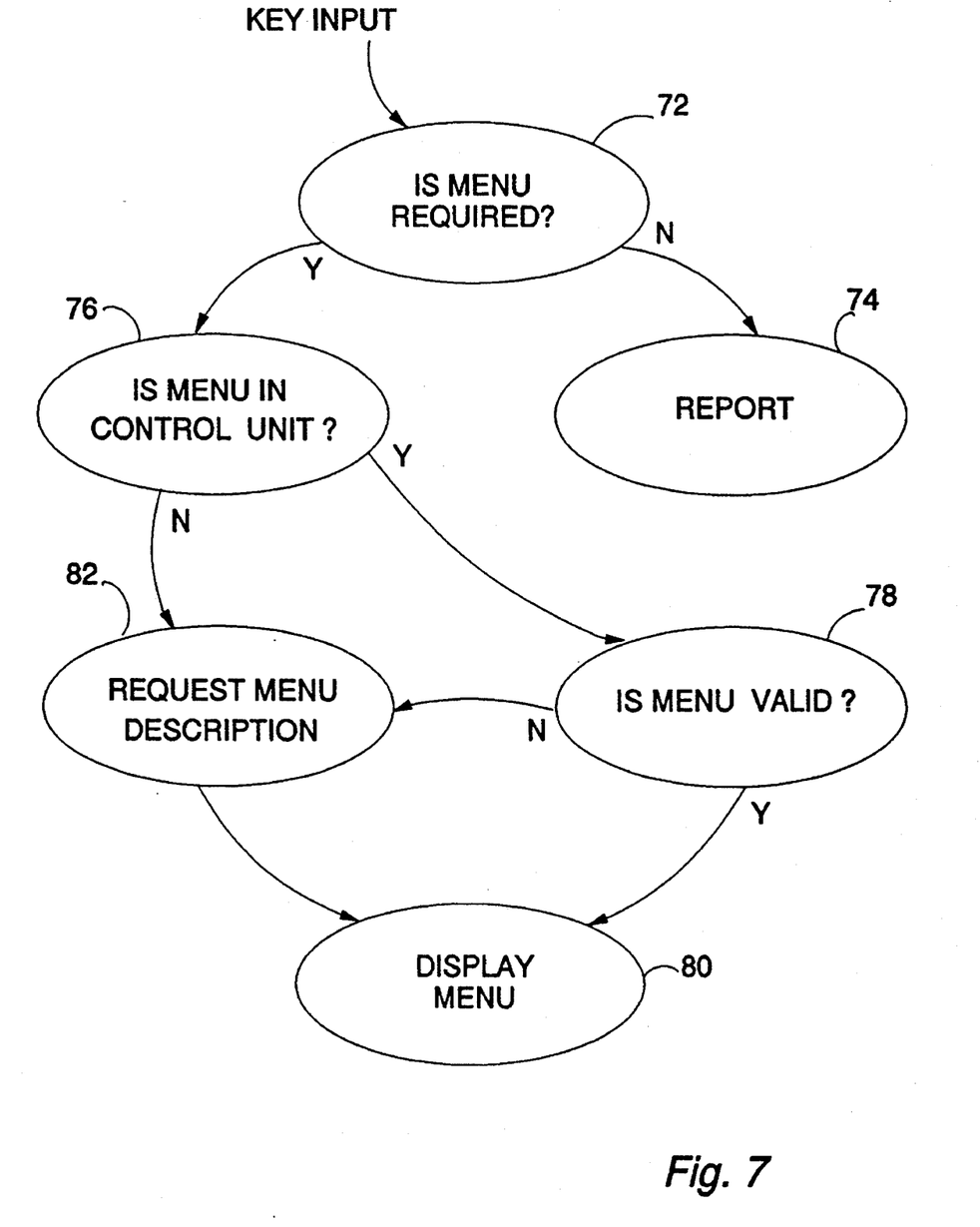

FIG. 7 illustrates the functions performed by the control unit in response to user operation of a key. A key can have two basic functions. The first is a mere pressing of the key switch which can be used to provide a user response to a prompt provided on the display. The other operation of a key is where a specific function is assigned to that key. An example of such a functional operation can be to request a new menu, to select a sub-menu from a main menu or to select an item or entry in a sub-menu. Another function can be to change the display of an operating parameter of a controllable unit. Such operating parameters can, for example, be displayed by means of a bar chart. Operating an appropriately programmed key does not cause the bar chart to be changed directly. Rather the operation of a key causes the control unit, under control of the microprocessor 32 to transmit an appropriate message to the controllable unit concerned.

In response to that operation, the controllable unit carries out the functions required. If in response to such operations a bar chart or menu is to be changed, descriptor information for a new definition of a menu or a new definition of the bar chart display as appropriate is sent back to the control unit which can then cause updating of the display.

In FIG. 7, therefore, on operation of a key, a test is performed at step 72 to determine whether a new menu is required. If not, the operation of the key is reported by an appropriate message to the controllable unit 12 in step 74. If the display of a new menu is required by the operation of the key, a test is made in step 76 to see whether that menu descriptor is already in the memory of the control unit. If the menu descriptor is already contained in the working memory of the control unit, then in step 78 the control unit checks whether the menu is valid. One method for the control unit to do this is to send a message to the controllable unit to ask that unit to verify whether the menu is valid. If the response from the controllable unit is that the menu is valid, it is then displayed in step 80 in accordance with the menu descriptor. If, however, the required menu is not in the working memory of the control unit, or the menu descriptor identified in step 76 was found in step 78 to be invalid, then the control unit, in step 82, generates a message to the controllable unit to request a new menu description. When the menu description is received from the controllable unit (as described above this may be achieved through a series of individual descriptors for the menu items and programmer user input devices) it is then displayed in step 80 on the display in accordance with the menu descriptor.

Figure 8:
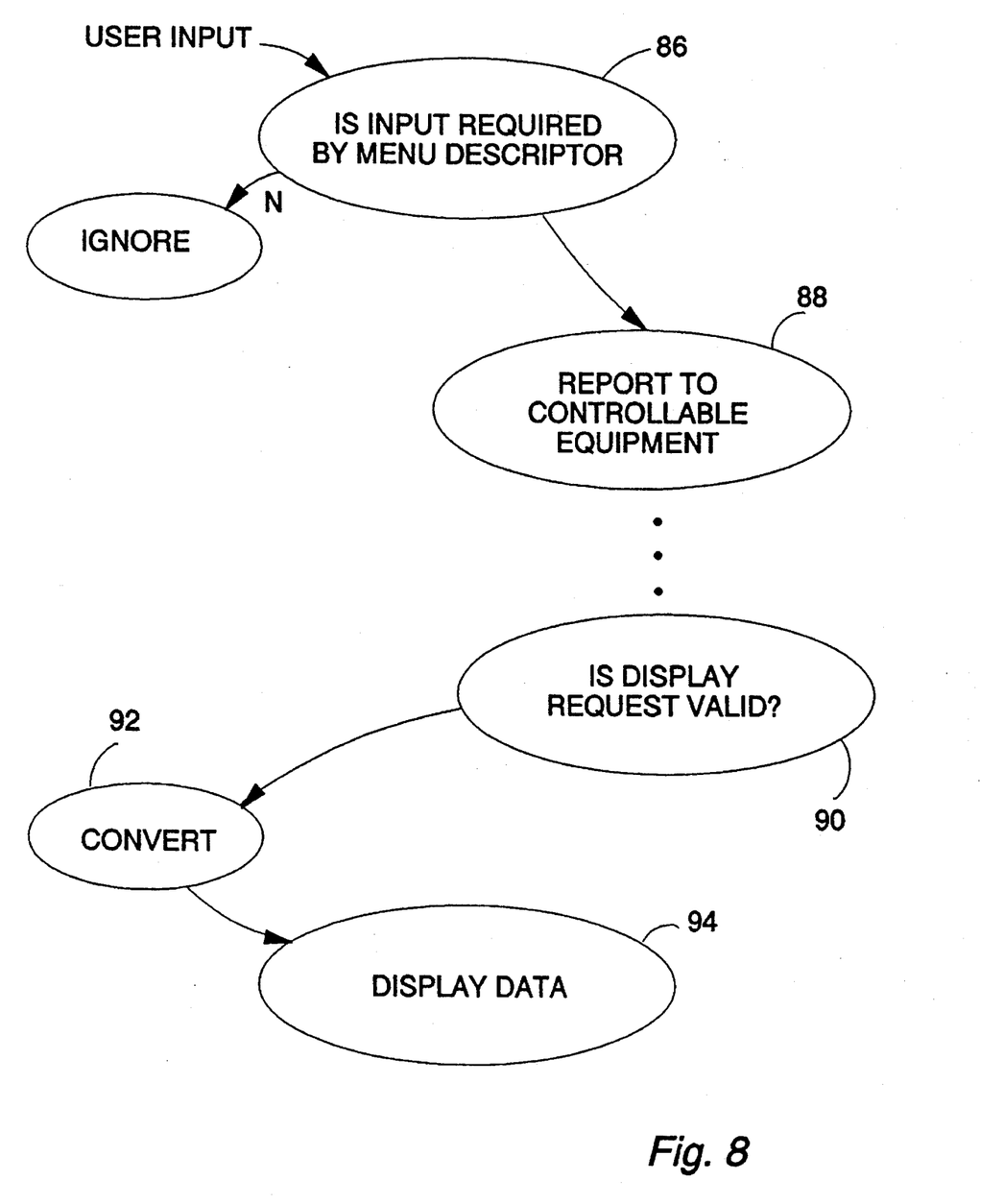

FIG. 8 illustrates the functions performed by the control unit in response to the operation of a user input device other than a key which is assigned the function of a menu selector.

Such control devices may take the form of rotary devices, sliders or fader arms, joy sticks, mice and keys which are allocated non-menu functions. On detecting the operation of one of the input devices such as indicated above, a test is made in step 86 to determine whether the operation of such a device is required by the current menu descriptor. If it is not required, then the operation of that input device is ignored. If, however, the operation of the particular input device is permitted under the menu descriptor, the control unit reports in step 88 the change to the input device to the controllable unit. The controllable unit will then respond to the data provided by the control unit. At some subsequent time, a message packet may be received from the device updating the display. A test is made at step 90 to determine whether the change of display as requested by the controllable unit is valid. If it is invalid it is ignored. If, however it is valid, the data is converted in step 92 into data which is suitable for display in step 94 on the display means. The conversion in step 92 is performed in accordance with the menu descriptor. Thus, for example, an absolute value can be used to change the display of a bar chart, or it could be displayed simply as a number as required by the menu descriptor.

The control unit, in step 88, interprets the operation of a user input device in accordance with a functional definition in the current menu descriptor for that device. The present embodiment of the invention permits the interpretation of variable input controls such as sliders or rotary controls in three different ways. The first is known as a relative input in which any movement of a variable device is reported as plus or minus values in terms of increments. For example, on a rotary control, five degrees may be interpreted as an increment of one. Alternatively, the operation of a device can be interpreted in a fixed way, such that the position of the device is reported as a value, possibly as a positive or negative value with respect to some intermediate position. The third type is termed an absolute type in which an initial position of a variable control is initialised as a home position and thereafter the position of that device is reported as position (i.e. unsigned) values.

Figure 9:
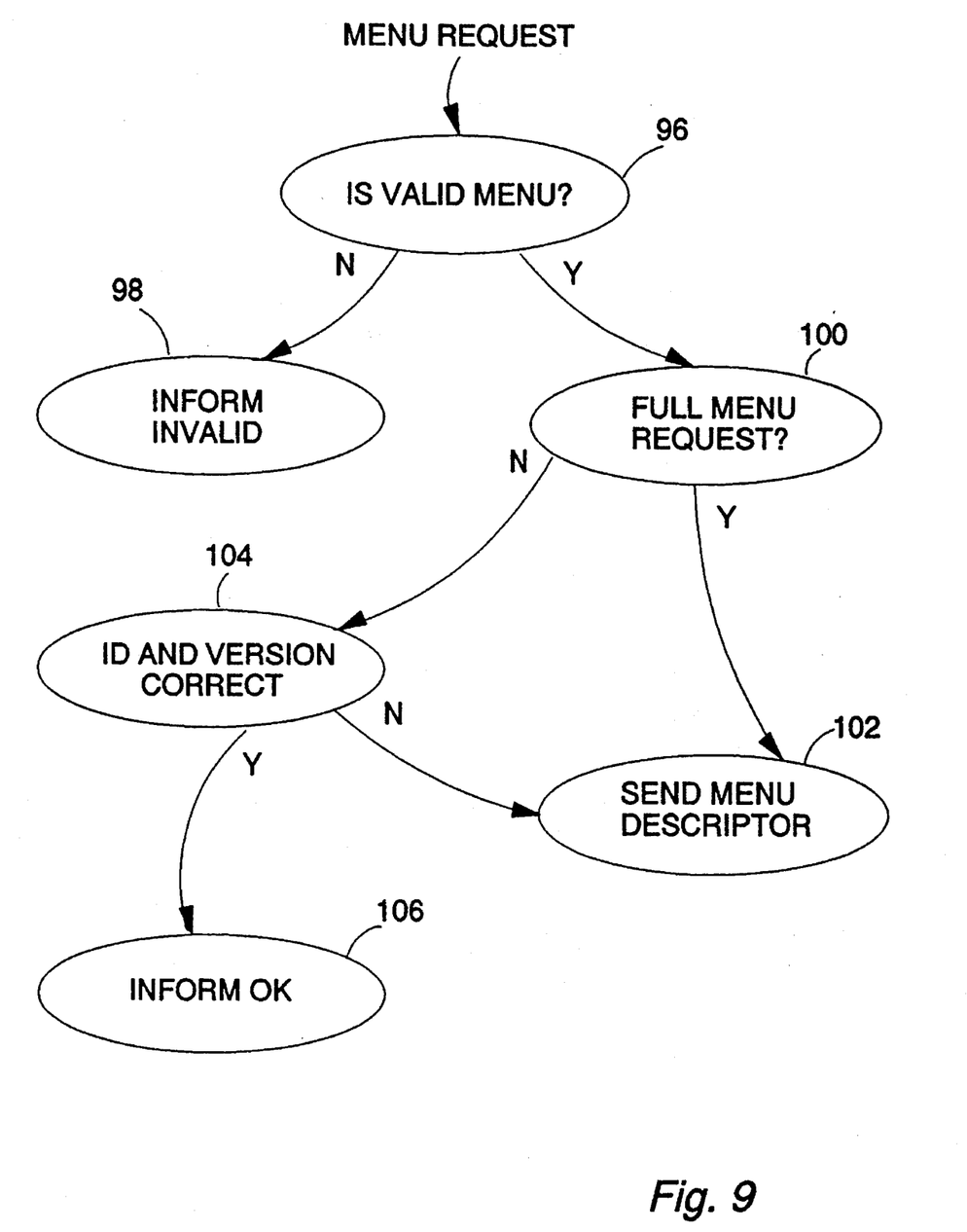

FIG. 9 illustrates the operation of a controllable unit in response to a request concerning a new menu (i.e. steps 78 or 82 of FIG. 7). In step 96 a test is performed to see whether the menu requested is in fact valid. If the menu request is invalid, a message is sent in step 98 to the control unit indicating this fact and causing the display of information to this effect. If the menu is valid, a test is made in step 100 to see whether the menu request is a request to send a complete menu descriptor (i.e. a request made in step 82 of FIG. 7). If it is such a request, then, in step 102 a message or messages defining the description of the menu is/are transmitted to the control unit to cause the display of the menu. If the request is to check the number and version of a menu already held by the control unit (i.e. a request made in step 78 of FIG. 7), then, in step 104 number and version of the menu is verified. If the number and/or version of the menu were incorrect, then this can be reported to the control unit, or, alternatively, the correct menu description can be sent directly in step 102 to the control unit to cause display of that menu. Otherwise, a message is sent in step 106 to indicate to the control unit that the menu descriptor is already possesses is valid.

Figure 10:
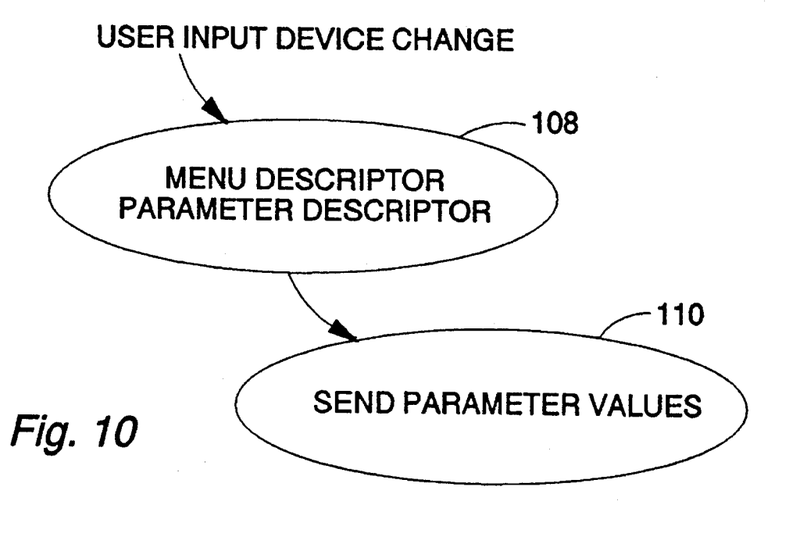

FIG. 10 illustrates the functions performed by a controllable device in response to a request from the control unit to change the operating parameters displayed on the control unit. This can be as the result of one selection from a menu displayed on the display of the control unit. In step 108 the controller access the menu descriptor and the parameter display descriptor to determine whether the request is valid and to obtain the new descriptor required by the control unit. The new descriptor, for example a descriptor for a new bar chart, including the values to be displayed within that bar chart can then be sent in step 110 to the control unit.

Figure 11:
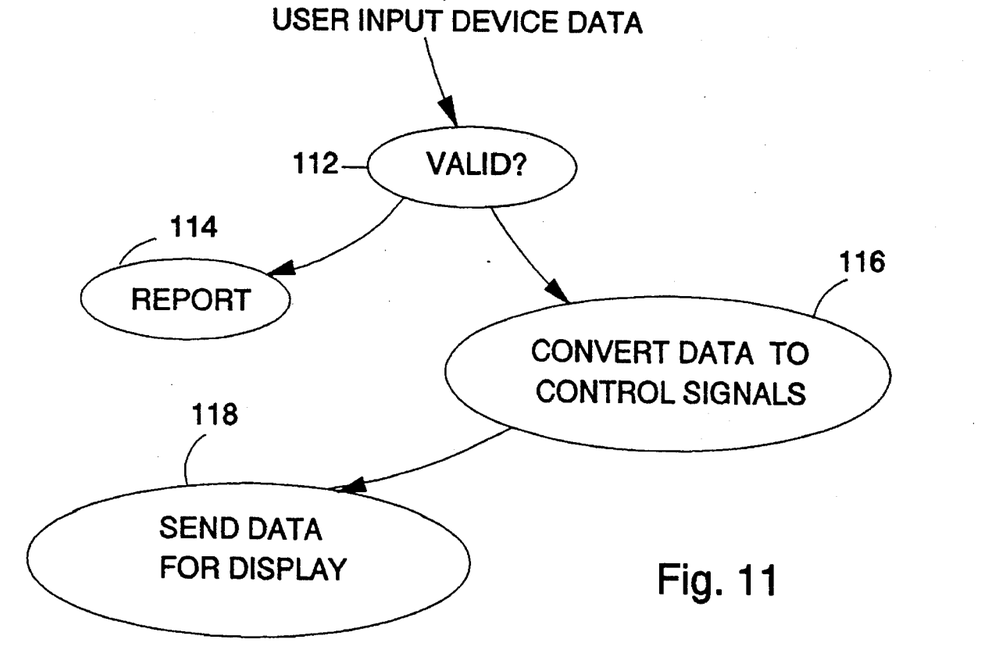

FIG. 11 illustrates the functions performed by a controllable unit in response to a message from the control unit indicating the operation of an input device by the user. In step 112, a test is made to test whether the contents of the message are valid. If the contents of the message are invalid, then a report is transmitted in step 114 to the control unit to request transmission. If, however, the message is valid, then the data field of the message packet is taken and converted in step 116 to actual control signals for controlling the operation of the controllable unit. Changes to the values of the parameters in the controllable unit are transmitted to the control unit in step 118 by means of an appropriate message or messages to cause updating of the display of the control unit.

The operations described with reference to FIGS. 7 to 11 above, set out the basic operations performed by the control unit and the controllable units in an embodiment of the invention.

There has been described apparatus and a method of controlling controllable equipment by means of a programmable control unit. Each piece of controllable equipment includes a control structure definition for that equipment. The controllable equipment is responsive to a request from the control unit to supply the control structure definitions to the control unit where it is used for programming that control unit. Examples of the operation of the control unit and the controllable unit have been described above.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus comprising:

a plurality of controllable pieces of equipment each having a storage device in which data representing a respective control structure definition is stored therein and means for transmitting the stored data representing said respective control structure definition from the respective storage device in response to a signal requesting said data;

control means including user operable input means which are programmable to have respective functions, programmable display means, means responsive to an initial operation of the input means for transmitting to at least one of said controllable pieces of equipment said signal requesting said data representing said respective control structure definition, and means for programming at least one of the display means and said input means with respective allocated functions in response to said stored data representing the respective control structure definition transmitted from each of said controllable pieces of equipment; and a data line coupled to said control means and each of said controllable pieces of equipment for enabling a transfer of data therebetween;

each of said controllable pieces of equipment are arranged in a serial daisy chain manner such that said control means is connected to a first controllable piece of equipment by way of said data line and said first controllable piece of equipment is connected to a second controllable piece of equipment by way of said data line.

2. Apparatus as claimed in claim 1 wherein at least one of said selectable items is a request for additional control structure definitions from corresponding controllable pieces of equipment.

3. Apparatus as claimed in claim 1 wherein said programmable display means comprises a two-dimensional pixel-based display programmable by said control means in response to said control structure definition, by activating pixel positions on said pixel-based display.

4. Apparatus as claimed in claim 1 wherein said programmable display means displays the respective functions allocated to said user operable input means by said control structure definition.

5. Apparatus as claimed in claim 1 wherein said user operable input means includes at least one user operable activating device for changing said functions of the respective input means by providing either an incremental change in a predetermined value in respect to a positional change in the activating device, or by providing a fixed value representative of a position of the activating device, or by providing an absolute value representing a difference between the position of the activating device and a reference position thereof.

6. Apparatus as claimed in claim 1 wherein each of said controllable pieces of equipment is selected from the group of a video camera, a video effects unit and a video tape recorder.

7. Apparatus as claimed in claim 1, wherein the control structure definition defines a representation of a status of an operating parameter of at least one of said controllable pieces of equipment in the form of a bar chart for display on said programmable display means.

8. Apparatus as claimed in claim 1, wherein said control means further includes means for simultaneously accessing more than one of said controllable pieces of equipment.

9. Apparatus as claimed in claim 1 wherein each said control structure definition defines a menu for display on said programmable display means, said menu being comprised of selectable items which allocate respective functions to said user operable input means.

10. Apparatus as claimed in claim 9 wherein said control means is responsive to said initial operation of said user operable input means for transmitting to at least one of said controllable pieces of equipment said signal requesting the respective control structure definition, said signal including data representing respective functions of the corresponding input means and wherein the desired one or ones of said controllable pieces of equipment respond to said data which represents respective functions of the corresponding input means.

11. Apparatus as claimed in claim 1 wherein said control structure definition defines, for display on said programmable display means, a representation of a status of an operating parameter of the respective controllable piece of equipment.

12. Apparatus as claimed in claim 11 wherein said user operable input means is adjustable for controlling said operating parameter of at least one of said controllable pieces of equipment.

13. Apparatus as claimed in claim 1 wherein each said control structure definition and said signal are transmitted in the form of respective message packets, each message packet comprising a command field defining an instruction, and an address field identifying the recipient of said message packet.

14. Apparatus as claimed in claim 13 wherein each said message packet includes a field for identifying the amount of information of said message packet.

15. Apparatus as claimed in claim 13 wherein each of said controllable pieces of equipment is allocated a respective address, and wherein said address field of each said message packet comprises a plurality of bit fields corresponding to a respective controllable piece of equipment so that said control means can address a multiplicity of controllable pieces of equipment simultaneously.

16. An apparatus as claimed in claim 1, wherein each said control structure definition and said signal are transmitted in the form of respective message packets, each message packet including a first field defining the amount of information of said message packet and a second field defining an instruction.

17. An apparatus as claimed in claim 16 wherein said message packet further includes a third field identifying the recipient of said message packet and a fourth field for additional data.

18. An apparatus as claimed in claim 17 wherein each said controllable piece of equipment is allocated a respective address, and wherein said third field comprises a plurality of bit fields each corresponding to a respective controllable piece of equipment so that said control means can address a plurality of controllable pieces of equipment simultaneously.

19. A method of controlling a plurality of controllable pieces of equipment each having a storage device in which data representing a respective control structure definition is stored therein, by means of a programmable control unit having user operable input devices which are programmable to have respective functions and a programmable display, in which each of said controllable pieces of equipment are arranged in a serial daisy chain manner such that said control unit is connected to a first controllable piece of equipment by way of a data line and said first controllable piece of equipment is connected to a second controllable piece of equipment by way of said data line, said method comprising the steps of:

transmitting, in response to an initial operation of one of the input devices, a signal to at least one of said controllable pieces of equipment requesting said data representing said respective control structure definition of said at least one of said controllable pieces of equipment;

transmitting, from each of said controllable pieces of equipment, the stored data representing said respective control structure definition from the respective storage device, to said programmable control unit in response to reception of said signal; and programming at least one of said programmable display and said input devices with respective allocated functions in response to said stored data representing the respective control structure definition transmitted from each of said controllable pieces of equipment.

20. A method as claimed in claim 19 where said programmable display comprises a two-dimensional pixel-based display, and further comprising the step of programming the pixel-based display, by said programmable control unit, in response to said control structure definition, by activating pixel positions on said pixel-based display.

21. A method as claimed in claim 19 further comprising the step of displaying, on said programmable display, the respective functions allocated to said user operable input devices by said control structure definition.

22. A method as claimed in claim 19 comprising the step of displaying, one said programmable display, a representation, defined by the respective control structure definition, of a status of an operating parameter of the respective controllable piece of equipment.

23. A method as claimed in claim 22 wherein each of said input devices is adjustable for controlling said operating parameter of the respective controllable piece of equipment.

24. A method as claimed in claim 19 further comprising the steps of:
displaying on said programmable display a menu defined by each said control structure definition, said menu being comprised of selectable items; and
allocating functions defined by each said control structure definition to said input devices.

25. A method as claimed in claim 24 wherein said programmable control unit is responsive to said initial operation of said user operable input devices for transmitting to at least one of said controllable pieces of equipment said signal requesting the respective control structure definition, said signal including data representing respective functions of the corresponding input devices, and wherein the desired one or ones of said controllable pieces of equipment are responsive to said data which represents respective functions of the corresponding input.

26. A method as claimed in claim 24 wherein at least one of said selectable items, as defined by said control structure definition, is a request for additional control structure definitions from corresponding controllable pieces of equipment.

27. A method as claimed in claim 19 wherein each said control structure definition and said signal are transmitted in the form of a respective message packet comprising a command field defining an instruction and an address field identifying the recipient of said respective message packet.

28. A method as claimed in claim 27 wherein each said message packet includes a field for identifying the amount of information in said message packet.

29. A method as claimed in claim 27 further comprising the step of allocating a respective address to each of said controllable pieces of equipment and wherein the address field of each said message packet comprises a plurality of bit fields each corresponding to a respective controllable piece of equipment so that said programmable control unit can address a multiplicity of controllable pieces of equipment simultaneously.

* * * * *